July 26, 1927.
A. J. LARSON
1,637,120
HOLDER FOR FLATIRONS
Filed Feb. 23, 1927
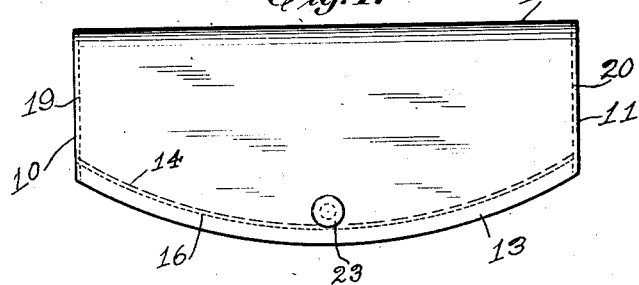
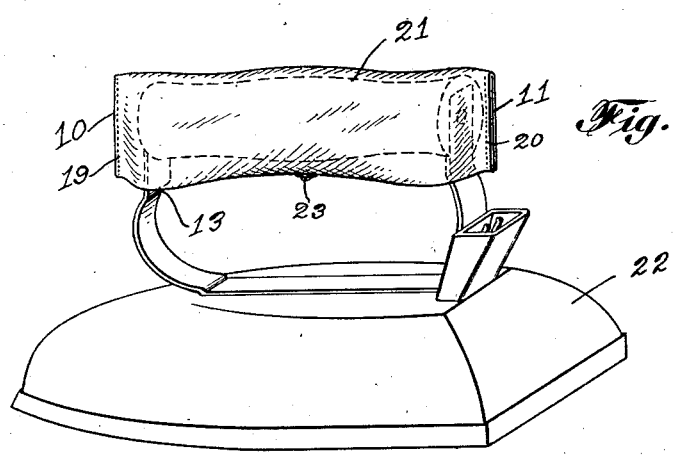
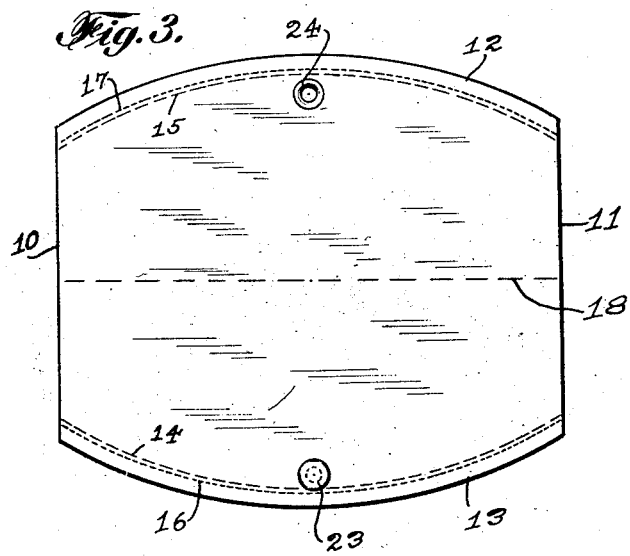
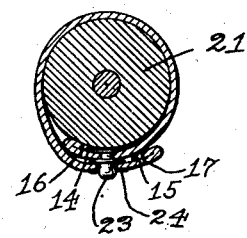
INVENTOR
*Anna J. Larson*
BY
*H. G. Manning*
ATTORNEY Patented July 26, 1927.

1,637,120

UNITED STATES PATENT OFFICE.

ANNA J. LARSON, OF NAUGATUCK, CONNECTICUT.

HOLDER FOR FLATIRONS.

Application filed February 23, 1927. Serial No. 170,145.

This invention relates to flatirons, and more particularly to a holder adapted to be wrapped about the wooden handle of an electric iron to protect the hand of the user from blisters and calluses formerly caused by rubbing against the wooden handle.

One object of the invention is to provide a device of the above nature which will be simple in construction, inexpensive to manufacture, easy to apply and manipulate, compact, ornamental in appearance, and very efficient and durable in use.

With these and other objects in view, there has been illustrated on the accompanying drawings one form in which the invention may be conveniently embodied in practice.

Fig. 1 represents a plan view of the holder.

Fig. 2 is a perspective view of the holder, as it appears when upon the wooden handle of an electric iron.

Fig. 3 is a developed plan view of the holder blank before it has been folded and stitched to its final shape.

Fig. 4 is a transverse sectional view taken through the holder and handle, said holder being shown in closed position wrapped about the handle.

Referring now to the drawings in which like reference numerals denote corresponding parts throughout the several views, the holder, before being folded into its final shape as shown in Fig. 1, comprises a substantially rectangular sheet of soft flexible material having straight ends 10 and 11 and curved sides 12 and 13, as shown in Fig. 3. While the holder is preferably made from fabric, it will be understood that it also may be made from leather, rubber, or other suitable anti-chafing material within the scope of the invention.

The first step in the manufacture of the holder from the blank shown in Fig. 3 is to fold the edges 14 and 15 of the curved sides 12 and 13 over upon the body of the sheet and then stitch said edges thereto along the lines 16 and 17, as clearly shown in Figs. 3 and 4. The blank will next be folded upon the center line 18, and the folded ends 10 and 11 bound together by lines of stitches 19 and 20.

In order to detachably connect the two sides 12 and 13 in closed position, wrapped around the center of the wooden handle 21 of the electric iron 22, provision is made of a stud 23 on the side 13, and a socket 24 on the side 12, said stud and socket being located inside the folded edges 14 and 15 at the centers of said curved sides 12 and 13.

In operation, when it is desired to install the holder on the wooden handle 21 of the electric iron 22, the holder will first be held vertically with its open sides down immediately above said handle. The holder will then be moved downwardly as far as it will go and the curved sides 12 and 13 will be wrapped around the center of the handle and fastened together by means of the stud 23 and socket 24, as clearly shown in Fig. 2. The straight ends 10 and 11 will enclose the ends of the handle and will lie vertical as shown.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

A holder for a flat iron handle comprising an elongated pad of soft flexible material, said pad being folded lengthwise in overlapping relation adjacent its longitudinal central axis and having its front and rear end edges each separately connected together to enclose the front and rear end portions of the handle and separable coacting fasteners for securing the longitudinal side edges of the pad.

In testimony whereof, I have affixed my signature to this specification.

ANNA J. LARSON.